April 8, 1969
J. M. DELI
3,437,385
TRACK JOINT HAVING FLOATING SEAL
Filed Jan. 24, 1967
Sheet 1 of 2
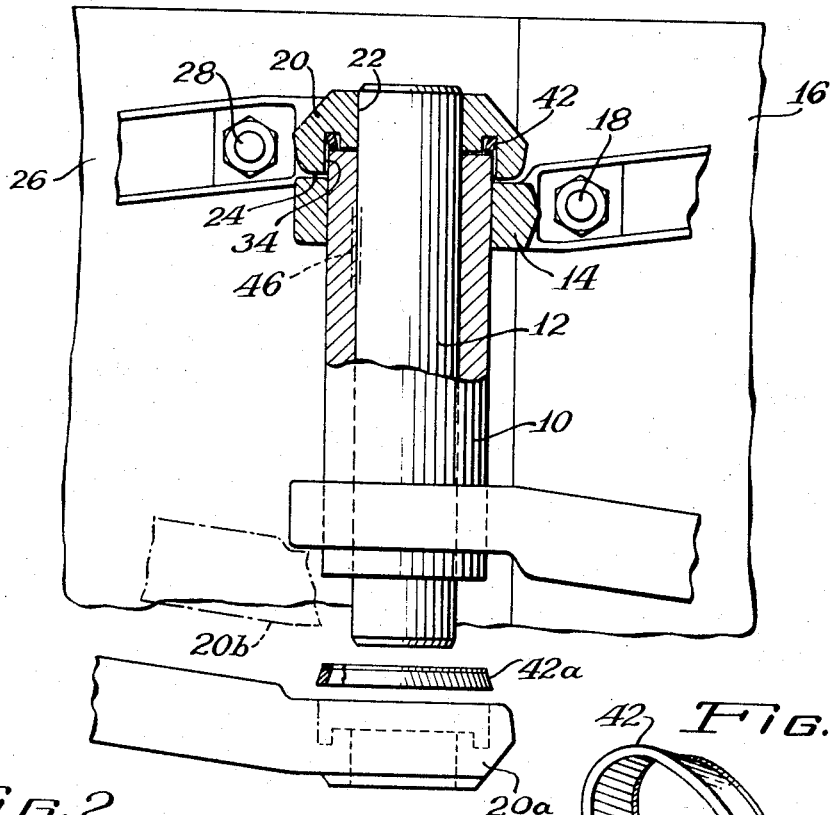
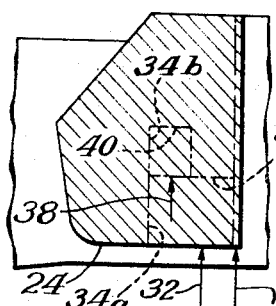
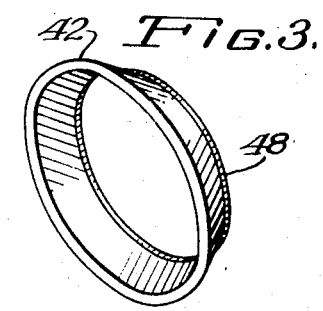
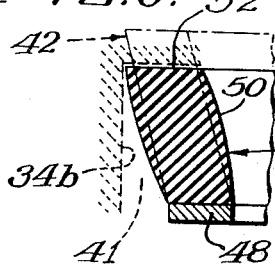
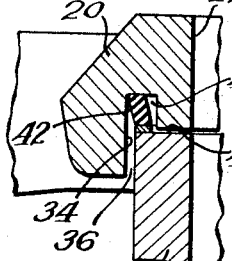
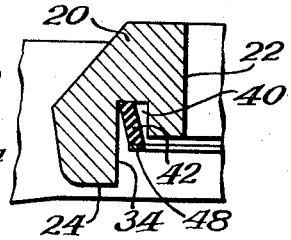
Inventor:
Jack M. Deli
By John W. Haines
Atty.

April 8, 1969  J. M. DELI  3,437,385
TRACK JOINT HAVING FLOATING SEAL
Filed Jan. 24, 1967  Sheet 2 of 2

Inventor:
Jack M. Deli
By John W. Gaines
Atty.

United States Patent Office 3,437,385
Patented Apr. 8, 1969

3,437,385
TRACK JOINT HAVING FLOATING SEAL
Jack M. Deli, Wheaton, Ill., assignor to International Harvester Company, Chicago, Ill., a corporation of Delaware
Continuation-in-part of application Ser. No. 576,152, Aug. 30, 1966. This application Jan. 24, 1967, Ser. No. 611,463
Int. Cl. B62d 55/08; B60s 1/62; F16j 15/38
U.S. Cl. 305—11                                    6 Claims

ABSTRACT OF THE DISCLOSURE

Sealed track chain joint having a bushing, a link counterbore receiving and housing therein the thrust end portion of the bushing, and a floating end-face seal in the link adjacent said thrust end portion and forming within the link a radial interface of sealing contact at least preferably in a ring at the outer end periphery of the bushing or, at most, in an outermost ring of pressure contact spaced apart radially outwardly from the bushing.

---

Figure 7:
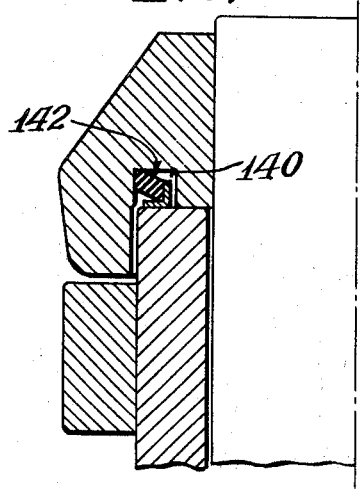

This application is a continuation-in part of U.S. patent application Ser. No. 576,152 filed Aug. 30, 1966, now Patent No. 3,402,974 and is related to applicant's assignee's application Ser. No. 518,437 filed Jan 3, 1966, now Patent No. 3,376,081.

The present invention relates to sealing means for chain link joints, particularly for the link joints in the endless track chain of a crawler vehicle. Such chain is provided with sealed in lubricant at the factory, and the sealing extends the life of joints by excluding contaminant from the lubricant.

In accordance with past practice, a sealed track link joint includes, besides a lubricant coated pin and a surrounding bushing between which the relative rotation occurs, a link having a bore to embrace the pin, a first re-bore to receive and house either the thrust end of the bushing or the seal, and sometimes a second re-bore to receive the seal in cas the first re-bore constitutes solely a bushing counterbore allocated to the bushing. Unless lubricant is effectively sealed thereamongst, the pin, link, and bushing parts tend to wear because of the relative rotation referred to.

A composite seal having a rubber back-up portion has been found especially effective in retaining the lubricant. It is therefore the practice to install such seal in direct contact with the end of the bushing, the locations of the respective bushing end and of the area of sealing contact thus made therewith being generally at the points most convenient in the particular arrangement of a joint.

Such an arrangement can consequently lead to difficulties because of failure of an existing joint to properly house or offset the thrusting end area of the bushing and/or the edge of the sealing contact area from direct infiltering of contaminant, i.e., provision of no offset axially from the plane between the hinged links, or because of failure to seal on the outside of thrust area of the thrusting end of the bushing, or because of failure to employ the thrusting end of the bushing as a bottoming means to set the space to receive the composite seal, thereby failing to properly gauge the pre-load on the seal and at the same time failing to isolate the rubber from the severity of the side thrust reaction in the chain.

Figure 8:
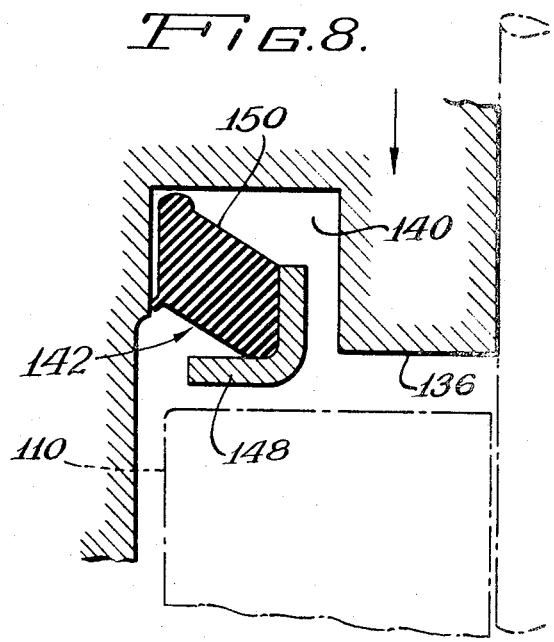
Figure 9:
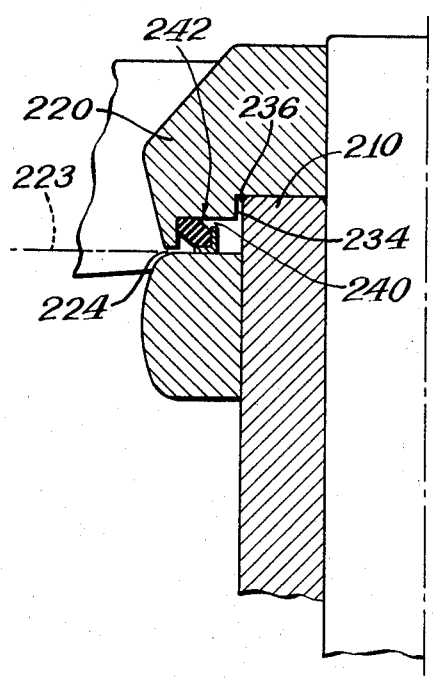
Figure 10:
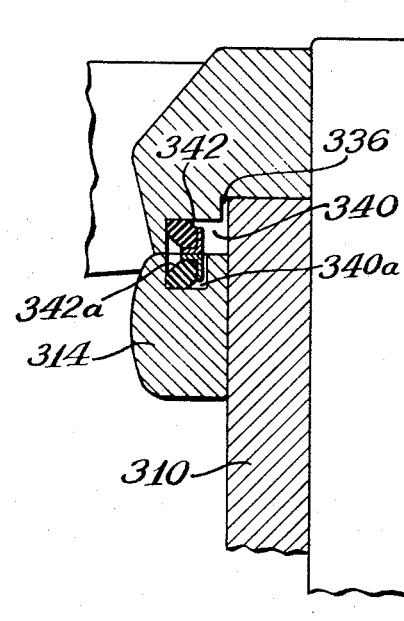

The foregoing difficulties are materially reduced if not substantially eliminated by my invention, in which the bushing thrust end and the seal cooperate to set the spacing and perform the outside sealing, respectively, and in which the edges of the bushing thrust face and/or the seal face are axially offset from the plane of direct entry of contaminant, all as will now be explained. Further features, objects, and advantages will either be specifically pointed out or become apparent when, for a better understanding of the invention, reference is made to the following description, taken in conjunction with the accompanying drawings which show a preferred embodiment thereof and in which:

FIGURES 1, 2 and 3, which show a track joint embodying the present invention, are plan assembly, sectional detail, and isometric detail views, respectively;

FIGURES 4, 5, and 6 are each sectional detail views similar to, but to larger scale than, FIGURE 1;

FIGURES 7 and 8 are similar to FIGURES 4 and 5, respectively, but show a modified embodiment; and FIGURES 9 and 10 are similar to FIGURE 1 but each shows a different further modification.

In FIGURES 1, 2, 3, 4, 5, and 6, the bushing 10 as shown has a track pin 12 rotatably received therein and, at one end, an inner link portion 14 of a pair of track links embraces that end of the bushing 10. The inner link of the pair carries a relatively leading track shoe 16 secured thereto by bolts including a bolt 18.

A bored outer link 20, which embraces a corresponding end of the pin 12, has a bore 22 in which the pin is received. The link 20 also has an inner face 24 which mutually confronts the inner link portion 14 to define a space which is in the plane between the hinged links and which measures between about 0.000 and 0.010 inch. The link 20 carries a trailing track shoe 26 secured thereto by bolts including a bolt 28. The links are steel forgings.

A rotary cutting tool, not shown, is introduced in the direction of an arrow 30 (FIGURE 2) so as to remove the material and form the finished bore 22. A re-bore, indicated by an arrow 32 between the bore 22 and a cylindrical wall 34, forms a main portion 34a of the cylindrical wall 34 (FIGURE 5), and also forms the radially inwardly extending main floor of a counterbore 36 receiving, and confronted by, the adjacent end of the bushing 10. A re-bore indicated by an arrow 38 between the cylindrical wall and the main transverse floor of the counterbore 36 forms a seal recess 40 with a second floor and a general prolongation or continuation 34b of the main portion 34 of a cylindrical wall.

The re-boring can be done separately, or jointly so that the counterbore 36 and recess 40 are formed in one operation of the same tool.

A seal assembly 42, bonded together in one piece and having the shape of a Belleville washer is inserted, large end first, into the seal recess of the outer link 20 before that link is press fitted onto the adjacent end of the pin 12. An identical seal assembly 42a is similarly introduced into an identical companion outer link 20a before the latter is press fitted onto the opposite end of the pin 12. The finally assembled position of the companion link 20a is indicated by the broken lines 20b, the bushing 10 being at each of its opposite ends solidly bottomed in the bushing counterbore at that end.

The FIGURE 4 showing of the end face 44 of the bushing 10 is illustrative of treatment of the opposite end faces of the bushing according to my invention. The face 44 has concentric, coplanar rings of pressure contact, the inner one of which is a static seal made with the floor of the counterbore 36 in thrust transmitting relation, and the outer one of which is made with the small end of the seal assembly 42 in dynamic sealing relation. The gap illustrated in FIGURE 4 between the cylindrical wall 34 and the bushing 10 is shown greatly exaggerated, and in practice hardly more than a piloting amount of clearance is present so that the housed end of the bushing will stay fairly free from contaminant.

As indicated, the foregoing joint is provided with sealed in lubricant at the factory. The seal 42 seals in the lubricant along its ring of pressure contact with the bushing end face 44 and seals out any contaminant which may sift in along the cylindrical wall 34. While it is true that wear is inevitable along the cylindrical interface 46 of contact between pin and bushing because of large track tension forces and the snaking action of the track, wear of the thrust end face 44 of the bushing is kept at a minimum by the body of internal lubricant.

In FIGURE 6, the seal 42 axially foreshortens so that the wall thickens when compressed into place in the recess 40 by the bushing 10. It consists of a steel, bushing engaging sealing ring 48 of small diameter and an elastomeric back-up portion 50. The back-up portion is frustoconical in shape and generally conforms to a parallelogram in cross-section.

The back-up portion 50 extends axially and rearwardly from the ring 48, in inclined relation thereto, and with the small leading end being of the same diameter as, and rubber-to-metal bonded to the rear face of, the sealing ring 48. In one embodiment the cone angle, at the apex, of the seal assembly was slightly in excess of 45°. The seal assembly works and self-adjusts in service. With the prolongation 34b of the cylindrical bore wall, the assembly defines a self-purging gap at 41 (FIGURE 6) having an annular shape of decreasing thickness.

A large diameter, radially outer end 52 of the back-up portion has radial and axial engagement with the cylindrical wall part and floor part of the seal recess 40 which is spaced apart axially and radially outwardly from the sealing ring 48. In cooperation with the ring, the large end 52 places the back-up portion 50 in unrestricted axially and radially distortively compressed condition throughout the entire cross-section thereof between the engaged parts of the recess and the sealing ring. It is clear upon inspection of FIGURES 1 and 4 to 6 that the back-up portion is otherwise unconfined within the seal recess 40.

In service, each outer link 20 retains a sound counterbore, and can be reused when the pin and bushing have worn at interface 46 to the point that replacement or turning is necessary. One of the contributing factors is the inner ring of pressure contact which is metal to metal against the bushing end face 44 but which is coated with lubricant and unyieldingly takes the thrust of the so-called side loading of the chain. Another factor is the outer ring of pressure contact on the end face 44 which is metal to metal but coated with lubricant and which provides a floating seal. The back-up behind the outer ring of pressure contact comprises an elastomeric portion 50, freely acting in combined compression and shear, to axially yield and adapt over a wide range of adjustment due to variations such as manufacturing variations and tolerances. The final factor is the bushing counterbore 36, i.e., a counterbore in the outer link wherein the bushing and outer link overlap, protecting the joint and enabling the link to house substantially the entire thrust or outer end portion of the bushing therein.

The critical function of having the back-up portion press both radially inwardly and axially upon the seal ring member so that it is always forced into a centered position against the outer periphery of the bushing can be accomplished with an unbonded composite structure.

Such structure is illustrated in FIGURES 7 and 8. A composite seal assembly 142 within a seal recess 140 in a link has a back-up portion 150 provided with similarly inclined diagonal walls. However in contrast to the preceding embodiment, the end faces of the back-up portion 150 when viewed in cross-section are axially parallel to one another rather than parallel in radial planes. Nevertheless, the fundamental Belleville washer appearance is retained, with the back-up portion 150 being frustoconical and conforming generally to a parallelogram in cross section.

A sealing ring member 148 in the assembly has a generally L-shaped cross section and, in lieu of the preceding bonded coupling, is frictionally coupled to the back-up portion due to receiving the small end of the latter in the included angle between a radial leg of the L-section and an axially extending leg of the L-section. Proper spacing is accomplished, to stress the composite seal without mashing it during assembly, by pressing a track pin bushing 110 against the seal assembly 142 until the bushing 110 solidly abuts the main floor of a link counterbore 136. Again, the entire cross section of the back-up portion 150 is unrestrictively axially and radially distortively compressed. In one physically constructed embodiment of the invention, the cone angle, at the apex of the seal assembly 142, was slightly less than 120°.

If a seal recess 240 is provided which intersects the inner face 224 of an outer link 220 and the cylindrical wall 234 of a link counterbore 236 as shown in FIGURE 9, then a double offset of the thrust end of a bushing 210 can be obtained relative to the plane 223 between the two track links, although the wearing interface of the frictionally coupled composite seal assembly 242 is positioned planar to the space between those two links. By a frictionally coupled assembly of parts, I mean parts frictionally fixed to one another such as the hard-faced part fixed to an end of the elastomeric back-up part, and an opposite end of the elastomeric back-up part fixed to the wall or floor or both in the re-bore.

If duplicate ones 342 and 342a of the frictionally coupled seal assemblies are provided in mirror image relation to one another so as to retain an outermost ring of pressure contact spaced apart radially outwardly from a bushing 310 in the joint as shown in FIGURE 10, then the added wearing interface is against a seal-ring member rather than against an inner link portion 314, although an additional seal recess 340a must be provided which confronts the existing seal recess 340 and each of which equally retains the seal assemblies in part. In any case in the re-bore forming the seal recess 340, that recess is coextensive in depth with no more than a major portion of the counterbore 336, and the recess forms merely a lateral extension of a portion of the latter.

My floating seal joint is primarily adapted to crawler vehicles, for use in the endless track assemblies thereof in which the paired links form a chain at each side. The chain and track shoes are conventional in that respect, the crawler track construction and operation being generally known as shown in expired Patent No. 2,376,864. All joints in the endless track are sealed at each end in the same way, except possibly for the master pin joint, not shown.

The language herein calling for embracing one part of a pair by the other part, is in reference to using a pressed together assembly in which an interference fit between the pair of parts prevents relative rotation and prevents endwise shift of the embraced part. By a back-up portion which is elastomeric I mean a compound natural or synthetic rubber, such as Buna-N material which is a readily available, abrasion resistant, seal elastomer in commercial use. Contaminant has reference to silt, dirt, and other abrasion-causing foreign matter.

Variations within the spirit and scope of the invention described are equally comprehended by the foregoing description.

What is claimed is:

1. In an endless track, chain, or the like having a pin and bushing joint in which a thrusting end of the bushing is adapted to be received:

the combination with the bushing and a companion pin received therein, of a bored link embracing an end of the pin, having a bore in which the pin is so embraced and which is adapted to intersect a bushing counterbore, said link further having an inner face;

a re-bore in the link between the bore and inner face, intersecting the bore and comprising a bushing counterbore formed with a cylindrical wall for receiving, and formed with a transverse main floor for engaging, the received end of the bushing;

a second re-bore in the link intersecting the cylindrical wall and the link inner face, the second re-bore forming a seal recess having a second floor and providing a lateral extension (240) of a portion of the bushing counterbore; and seal means received in said laterally extending seal recess establishing, with a surface fixed with respect to the inner link, a radial interface of sealing arranged in an outer ring of pressure contact spaced apart radially outwardly from the bushing;

said seal means comprising a floating seal characterized by a seal ring member of hard material, and a relatively flexible, frusto-conical back-up portion which supports the seal ring member as a floating face seal.

2. The invention of claim 1, further characterized by an inner link portion embracing the bushing at a point spaced away from the received end thereof, said inner link portion confronting said inner face and seal means (242) and establishing the wear interface with the latter.

3. The invention of claim 1, further characterized by:
an inner link portion embracing the bushing at a point spaced away from the received end thereof, said inner link portion having a seal recess and arranged whereby the respective inner link portion and inner face, and their respective recesses, confront one another;

said seal means (342, 342a) comprising plural floating seals in part in one recess and in part in the other.

4. The invention of claim 1, characterized by:
the frustoconical back-up portion generally conforming to a parallelogram in cross section and extending axially rearwardly from the seal ring member in inclined relation thereto;

said back-up portion providing friction engagement, by means of the leading end thereof, with the rear of said seal ring member; said back-up portion providing axial and radial friction engagement, by means of the other end thereof, with a part of said seal recess off-set both radially outwardly of and axially from said seal ring member;

said back-up portion, in cooperation with said seal ring member, placing said back-up portion in unrestricted axially and radially distortively compressed condition throughout the entire cross section thereof between the respective part of the seal recess and seal ring member and providing a frictional interlock therebetween, said back-up portion except for its friction drive engagement with said member and recess part being otherwise unconfined within said seal recess.

5. In an endless track, chain, or the like having a pin and bushing joint in which a thrusting end of the bushing is adapted to be received:
the combination with the bushing and a companion pin received therein, of a bored link embracing an end of the pin, having a bore in which the pin is so embraced and which is adapted to intersect a bushing counterbore, said link further having an inner face;

a re-bore in the link between the bore and inner face, intersecting the bore and comprising a bushing counterbore formed with a cylindrical wall for receiving, and formed with a transverse main floor for engaging, the received end of the bushing;

a second re-bore in the link intersecting the cylindrical wall and the link inner face, the second re-bore forming a seal recess having a second floor and providing a lateral extension (240) of a portion of the bushing counterbore, the second and main floors characterized respectively by a deep off-set from, and by a deeper off-set from, said inner face (224) of the link;

an inner link portion embracing the bushing at a point spaced away from the received end thereof, said inner link portion having a seal recess and arranged whereby the respective inner link portion and inner face, and their respective recesses, confront one another; and seal means (342, 342a) one in one recess and one in the other, and each characterized by a seal ring member of hard material which cooperatively with the other seal ring member forms a face seal, and a relatively flexible, frustoconical back-up portion which, with the other back-up portion, supports the seal members as a floating face seal.

6. In the inner face structure of a track link, said link having a primary bore in which the link receives a track pin, said link being of the bushing counterbore type, in the inner face of which the received end of a bushing is adapted to be piloted, said link adapted to be in closely spaced apart relationship to an inner link portion which embraces said bushing:

the improved construction of a counterbore which houses the received end of the bushing;

there being a lateral continuation of a portion of the counterbore which forms a seal recess in the link inner face confronting the inner link portion, and no more than a major portion of which seal recess is coextensive in depth with the counterbore; and an end face seal assembly in said recess comprising a sealing ring member, and an elastomeric back-up portion frustoconical in shape and generally conforming to a parallelogram in cross-section;

said back-up portion extending axially rearwardly from said sealing ring member, in inclined relation thereto, with a leading end coupled rotatably fast to the rear of the sealing ring member;

said back-up portion providing axial and radial engagement, by means of the other end thereof, with a part of said seal recess offset both radially outwardly of and axially from said sealing ring member and, in cooperation with said member, placing said back-up portion in unrestricted axially and radially distortively compressed condition throughout the entire cross-section thereof between said recess part and said sealing ring member;

said back-up portion except for its engagement with the sealing ring member and with said part being otherwise unconfined in its freedom of movement.

References Cited

UNITED STATES PATENTS

| | | | |
|---|---|---|---|
| 2,389,874 | 11/1945 | Searles. | |
| 3,376,081 | 4/1968 | Deli et al. | 305—11 |
| 1,289,408 | 12/1918 | Davis | 305—11 |
| 2,341,900 | 2/1944 | Boden | 277—92 |
| 2,699,974 | 1/1955 | Deffenbaugh | 305—58 X |
| 2,777,688 | 1/1957 | Ehrlich | 277—95 X |
| 2,906,562 | 9/1959 | Burgman | 305—11 |
| 3,241,843 | 3/1966 | Hatch | 277—92 |
| 3,269,738 | 8/1966 | Baumler | 277—81 |
| 3,336,086 | 8/1967 | Reinsma | 277—95 X |
| 3,336,089 | 8/1967 | Krickler | 305—11 |

RICHARD J. JOHNSON, *Primary Examiner.*

U.S. Cl. X.R.

74—254; 277—92